July 10, 1934.  R. O. BROWN  1,965,921
LICENSE PLATE HOLDER FOR AUTOMOBILES AND THE LIKE
Original Filed Aug. 31, 1931
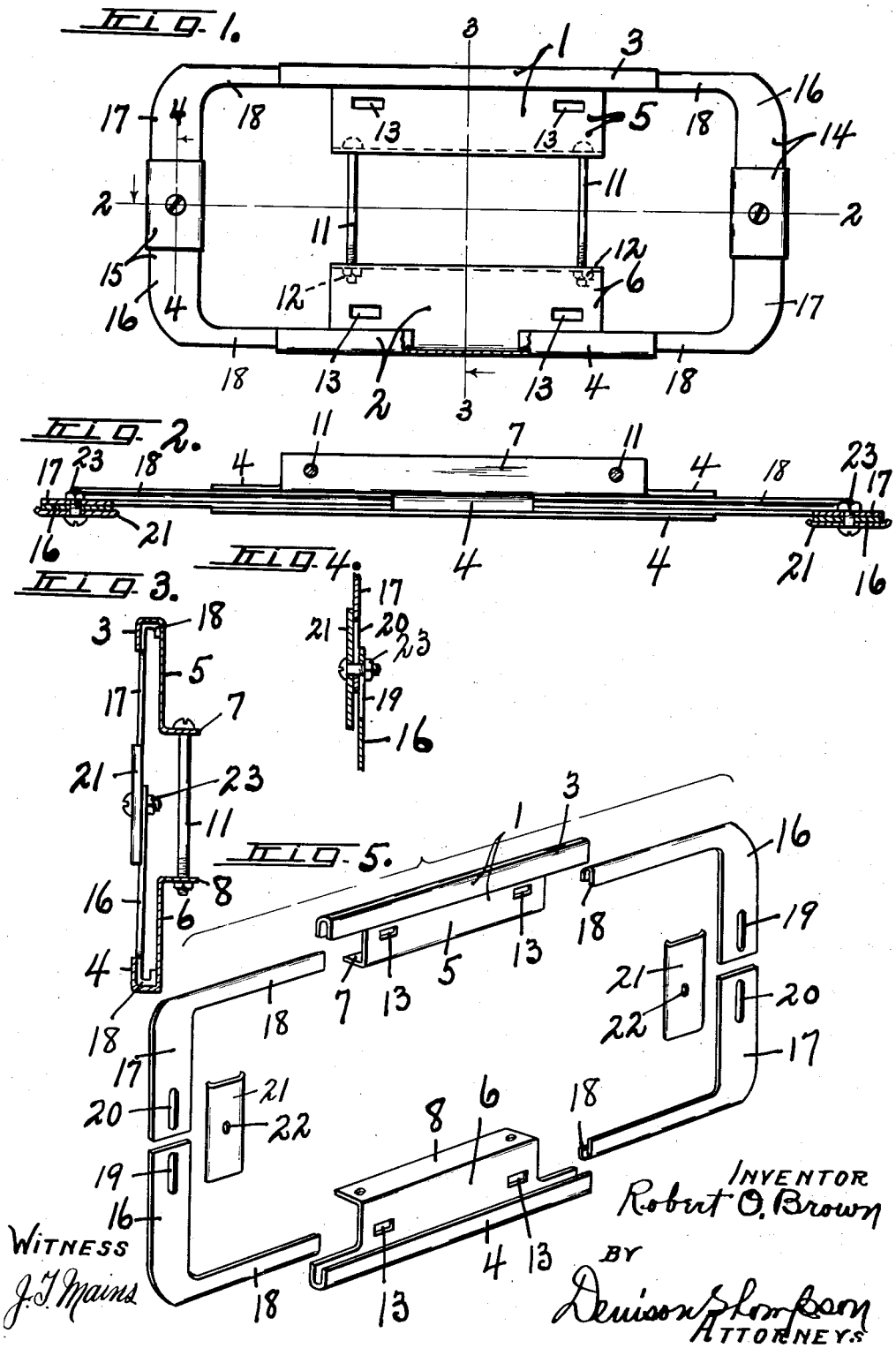

UNITED STATES PATENT OFFICE 1,965,921

LICENSE PLATE HOLDER FOR AUTOMOBILES AND THE LIKE

Robert O. Brown, Syracuse, N. Y.

Application August 31, 1931, Serial No. 560,396
Renewed November 17, 1933

13 Claims. (Cl. 40—125)

This invention relates to certain new and useful improvements in license plate holders for automobiles and the like.

The main object of the invention is the production of such a holder that is universally adjustable to securely support license plates of different width, of different length, or both.

A further object resides in the production of such a license plate holder of stable construction and that can be economically manufactured.

Other objects and advantages relate to the details of the structure and the relation of the parts thereof all as will more fully appear from the following description taken in connection with the accompanying drawing in which:—

Figure 1 is a front elevation of a license plate holder of this invention.

Figure 2 is a section on line 2—2, Figure 1.

Figure 3 is a section on line 3—3, Figure 1.

Figure 4 is a section on line 4—4, Figure 1.

Figure 5 is a perspective view showing the sections dis-assembled, but in position for assemblage.

The license plate holder of this invention comprises upper and lower intermediate sections 1 and 2, comprising elongated channel members 3 and 4 respectively, one edge of said channel members being provided with extensions or side plates 5 and 6 respectively, terminating at their outer edges in laterally extending flanges 7 and 8 respectively, which in the assembled structure, lie substantially parallel with each other within the borders of the license plate to be supported and extending rearwardly with respect thereto. Preferably as shown, the channel members 3 and 4 respectively extend outwardly some distance beyond the edges of the side plates 5 and 6.

Each of the flanges 7 and 8 are provided with openings 9 and 10, respective openings being arranged in alinement for the reception of bolts 11 equipped with nuts 12 for drawing the intermediate sections toward each other for tightly clamping a license plate as hereinafter described.

The length of the bolts is such as to permit vertical extension and contraction of the intermediate sections so as to tightly confine a license plate of any of the usual widths. Each of the extensions or side plates 5 and 6 are provided with spaced openings 13 adapted to receive a means such as screws for securing the license plate to a support or portion of an automobile.

It will be noted that the blank used in forming the intermediate sections 1 and 2 is identical in shape and interchangeable, the only distinction being that in the forming of these blanks into sections the flanges are oppositely bent.

Two end sections 14 and 15 are provided of similar form and shape and a description of one is applicable to the other. Each of these end sections comprises two elbow shaped bars 16 and 17. One of the legs of each of the angle bars is formed in channel shape as illustrated at 18 and these channels are of a width adapted to fit tightly and slidably in the channel bars 3 and 4 of the respective intermediate sections, and the license plate itself is adapted to fit within the channels 18 and when nuts 12 are tightened upon bolts 11 the edge of the license plate presses the channels 18 into such tight contact with channel members 3 and 4 that relative movement is frictionally prevented and the license plate as well as the holder parts are maintained rigidly in predetermined position.

By loosening nuts 12, lateral extension of the license holder is permitted by pushing in or drawing out either of the end sections 14 and 15 respectively. Vertical extension or contraction of the license holder is permitted, not only by loosening or tightening nuts 12, but also by reason of the fact that the overlapping ends of the sections 16 and 17 are provided with registering slots 19 and 20. A clip 21 of somewhat U shape form is provided, adapted to fit over the overlapping ends of the sections 16 and 17 and has an opening 22 for the passage of a bolt which also extends through slots 19 and 20 and is provided with an adjustable nut 23 adapted to maintain sections 16 and 17 in any desired relative overlapping relation within the limits of the length of the slots 19 and 20.

It will be apparent that this license holder is adjustable both vertically and longitudinally and that either adjustment is independent of the other so that the license holder is adapted for receiving and rigidly supporting license plates of any width or length within the ordinary range of such articles as at present used.

It will also be apparent that the sections 16 and 17 are formed from identical blanks and that the diagonally disposed sections are identical when formed and therefore interchangeable.

Although I have shown and described a specific construction form and relation of parts of a license holder as constituting a perhaps preferred embodiment of the invention, I do not desire to restrict myself to the details of form construction or arrangement, as various changes and modifications can be made within the scope of the appended claims.

I claim:

1. A license plate holder comprising opposed intermediate sections, each including a side plate with a channel member at one edge and a lateral flange at the other edge, the flanges being on adjacent edges of the sections, means engaging the flanges for adjustably securing the sections together, opposite end sections, each having portions slidable in the channel members of the intermediate sections, each of said end sections comprising two parts having their adjacent ends overlapped and provided with registering slots in the overlapped portions, clips covering the overlapped portions and having openings registering with said slots, and means extending through the openings in the clips and through the slots for holding the parts in adjusted position.

2. A license plate holder comprising opposed intermediate sections, each including a side plate with a channel member at one edge and a lateral flange at the other edge, the flanges being on adjacent edges of the sections, means engaging the flanges for adjustably securing the sections together, opposite end sections, each having elongated channel-shaped portions slidable in the channel members of the intermediate sections, each of said end sections comprising two parts having their adjacent ends overlapped and provided with registering slots in the overlapped portions, clips covering the overlapped portions and having openings registering with said slots, and means extending through the openings in the clips and through the slots for holding the parts in adjusted position.

3. A license plate holder comprising opposed intermediate sections, each including a side plate with a channel member at the outer edge thereof, means associated with each plate for adjustably securing said sections together, opposite end sections each having portions slidable in the channel members of the intermediate sections, each of said end sections comprising two parts having their adjacent ends overlapping and provided with registering slots in the overlapped portions, clips covering the overlapped portions and having openings registering with said slots, and means extending through the openings in the clips and through the slots for holding the parts in adjusted position.

4. A license plate holder comprising opposed intermediate sections, each including a side plate with a channel member at the outer edge thereof, means associated with each plate for adjustably securing said sections together, opposed end sections each comprising two parts each composed of an elongated channel-shaped portion slidable in a channel member of the intermediate sections and a flat member arranged in overlapping relation with the corresponding member of the companion part, and means associated with the flat members for holding the parts in adjusted position.

5. A license plate holder comprising opposed intermediate sections, each including a side plate with a channel member at the outer edge thereof, means associated with each plate for adjustably securing said sections together, opposite end sections each comprising two parts each composed of an elongated channel-shaped portion slidable in a channel member of the intermediate sections and a flat member arranged in overlapping relation with the corresponding member of the companion part, the flat members of each part being provided with registering slots in the overlapping portions, and means extending through the slots for holding the parts in adjusted position.

6. A license plate holder comprising opposed intermediate sections, each including a side plate with a channel member at the outer edge thereof, means associated with each plate for adjustably securing said sections together, opposite end sections each comprising two parts each composed of an elongated channel-shaped portion slidable in a channel member of the intermediate sections and a flat member arranged in overlapping relation with the corresponding member of the companion part, the flat members of each part being provided with registering slots in the overlapping portions, clips covering the overlapped portions and having openings registering with said slots, and means extending through the openings in the clips and through the slots for holding the parts in adjusted position.

7. A license plate holder comprising opposite intermediate sections, each including a side plate with a channel member at the outer edge thereof, means associated with each plate for adjustably securing said sections together, opposed end sections each comprising two parts each composed of an elongated channel-shaped portion slidable in a channel member of the intermediate sections and a member arranged in overlapping relation with the corresponding member of the companion part, said last-mentioned overlapping members being provided with registering slots, and means extending through the slots for holding the parts in adjusted position.

8. A license plate holder comprising opposite intermediate sections, each including a side plate with a channel member at the outer edge thereof, means associated with each plate for adjustably securing said sections together, opposed end sections each comprising two parts each composed of an elongated channel-shaped portion slidable in a channel member of the intermediate sections and a member arranged in overlapping relation with the corresponding member of the companion part, and means associated with said last-mentioned members for holding the parts in adjusted position.

9. A license plate holder comprising opposite intermediate sections, each including a side plate with a channel member at the outer edge thereof, means associated with each plate for adjustably securing said sections together, opposed end sections each comprising two parts each composed of an elongated channel-shaped portion slidable in a channel member of the intermediate sections and a member extending toward the corresponding member of the companion part at substantially right angles to the channel-shaped portion, and means associated with said last-mentioned members for holding the parts in adjusted position.

10. A license plate holder comprising opposite intermediate sections, each including a side plate with a channel member at the outer edge thereof, means associated with each plate for adjustably securing said sections together, opposed end sections each comprising two parts each composed of an elongated channel-shaped portion slidable in a channel member of the intermediate sections and a member extending toward the corresponding member of the companion part at substantially right angles to the channel-shaped portion, channel elements covering said last-mentioned members, and means securing said elements and members together for holding the parts in adjusted position.

11. A license plate holder comprising opposite intermediate sections, each including a side plate with a channel member at the outer edge thereof, means associated with each plate for adjustably securing said sections together, opposed end sections each comprising two parts each composed of an elongated channel-shaped portion slidable in a channel member of the intermediate sections and a member extending toward the corresponding member of the companion part at substantially right angles to the channel-shaped portion, said last-mentioned members being provided with elongated slots, channel elements covering said last-mentioned members and having openings registering with said slots, and means extending through the openings in the elements and through the slots for holding the parts in adjusted position.

12. A license plate holder comprising opposed intermediate sections, each including a channel member, means for adjustably securing said sections together, opposed end sections each comprising two L-shaped members each having one arm thereof slidable in a channel member of the intermediate sections and the other arm extending toward the corresponding arm of the companion L-shaped member, channel elements covering said last-mentioned arms, and means securing said arms and channel elements together for holding the parts of the end sections in adjusted position.

13. A license plate holder comprising opposed intermediate sections, each including a channel member, means for adjustably securing said sections together, opposed end sections each comprising two L-shaped members each having one arm thereof slidable in a channel member of the intermediate sections and the other arm arranged in overlapping relation with the corresponding arm of the companion L-shaped member, clips covering the overlapping arms, and means securing said arms and clips together for holding the parts of the end sections in adjusted position.

ROBERT O. BROWN.